Aug. 28, 1962  J. S. ENGEL  3,051,947
MOVING TARGET SELECTOR
Filed March 6, 1948  2 Sheets-Sheet 1

INVENTOR.
JAMES S. ENGEL
BY
ATTORNEY

INVENTOR.
JAMES S. ENGEL
BY
ATTORNEY

United States Patent Office 3,051,947
Patented Aug. 28, 1962

3,051,947
MOVING TARGET SELECTOR
James S. Engel, Tuckahoe, N.Y., assignor to International Telephone and Telegraph Corporation, a corporation of Maryland
Filed Mar. 6, 1948, Ser. No. 13,472
4 Claims. (Cl. 343—7.7)

This invention has reference to radio obstacle detection system for indicating moving targets and more particularly to such systems using a radiant energy storage device.

In radio obstacle detection systems utilized for the purposes of selecting or indicating moving objects in relation to stationary objects it has been the practice to provide means whereby certain of the selected signals are compared with one another whereby those signals due to moving obstacles or targets are rendered recognizable by the fact that they are productive of changing reflection patterns. In order to obtain a basis for comparing reflections separated in time, radiant energy storage devices have been provided which function to receive and store, for given periods of time, reflection signals pertaining to specific portions of the territory to be examined. Such stored signals are then reactivated and compared with reflection signals obtained immediately subsequent thereto. For a given set of stable transmitter signal characteristics, deviations therefrom in the reflected signal in relation to time which may be segregated, are indicative of moving objects.

Various types of radiant or electromagnetic energy storage devices have been used such as the mercury column and the mosaic type tube made familiar as the pick-up device in the television art.

It is an object of the present invention to provide an improved moving target selector system employing a storage or mosaic type tube.

A further object of the invention is to provide a moving target indicator system based on the use of a mosaic type comparison tube having dual signal storage facilities.

In accordance with certain features of the invention I provide a radio obstacle detection system which includes stabilized sources of radio frequency energy and of modulating pulse repetition frequency, for supplying a suitable transmitter. In the receiver of the system there is provided a mosaic type storage tube in accordance with my invention which permits a comparison to be made between a received reflected signal which has been stored for a certain period of time with another reflected signal occurring immediately subsequent thereto. The two signals are applied to the tube with opposite polarity and are arranged to occur coincidently and contemporaneously so that if the signals are equal the resulting signal voltage output will be zero. However, if the signals are not equal, the voltage appearing in the output will not be zero. This resultant voltage which may be of either sign is applied through a full wave rectifier to a suitable so-called P.P.I. tube (plane position indicator). Provision is also made for allowing an output to occur in the stoarge tube only when a comparison has been made between two successive reflected signals.

The above mentioned and other features and objects of this invention and the manner of attaining them will become more apparent and the invention itself will be best understood, by reference to the following description of an embodiment of the invention taken in conjunction with the accompanying drawings, wherein.

Figure 1:
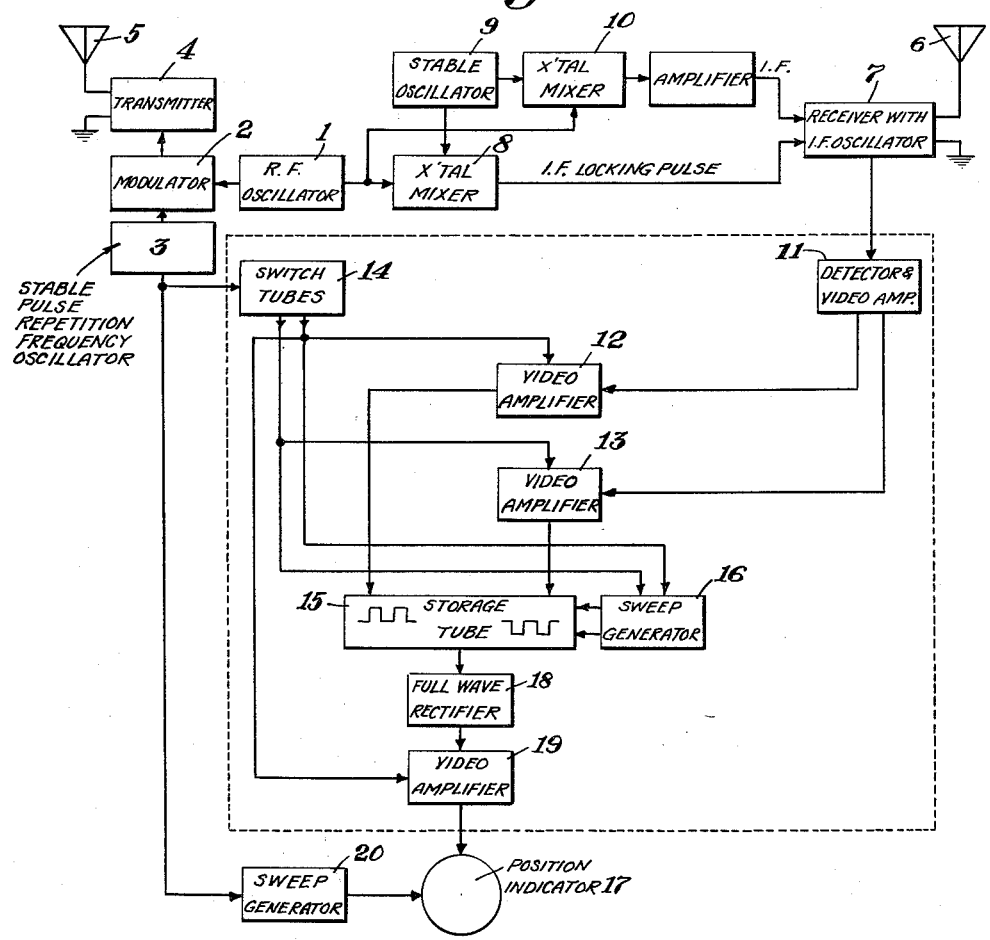
FIGURE 1 is a diagram in block form of an obstacle detection system for selecting moving targets in accordance with my invention.

Referring to the system shown in FIGURE 1, the transmitter side of the radio obstacle detection system shown herein comprises a radio frequency oscillator 1 which supplies a conventional modulator 2 which in turn is controlled by a crystal controlled modulating pulse repetition frequency oscillator 3. The output of the modulator is supplied to a suitable transmitter 4 which feeds into a radiator 5 for the purpose of effecting the transmission of radiant energy toward given targets. As the signals are reflected from the respective targets, both moving and stationary, they are picked up by a receiving antenna 6 which may, of course, in accordance with known practice, be identical with the transmitting antenna 5, and from there fed into a receiver 7 which includes an I.F. (intermediate frequency) oscillator (not separately indicated). This I.F. oscillator is controlled by a locking pulse obtained from a crystal type mixer 8 which is supplied from the radio frequency oscillator 1 and a stable oscillator 9. Another crystal controlled mixer is indicated at 10 which receives energy from the oscillator 1 and the stable oscillator 9 to provide suitable and stable intermediate frequency energy for heterodyning purposes at the receiver 7. The resultant intermediate frequency signal is detected and amplified in a detector-amplifier circuit 11 the output of which is simultaneously applied to video amplifiers 12 and 13 respectively. The operability of the amplifiers 12 and 13 is controlled from a set of electron switches schematically indicated by a block 14 which in turn is supplied a control signal from the crystal controlled oscillator 3. The amplifier 13 includes a signal polarity inverter whereby the output of the two amplifiers is effectively of opposite sign. The output of the amplifiers 12 and 13 is separately applied to a mosaic type storage and comparison tube 15 the details of which will be described in connection with the other figures. The storage tube 15 is also subject to control from a sweep generator 16 which is energized in synchronism with the activation of the two video amplifiers 12 and 13. The output of the storage tube 15 is fed to a plane position indicator type oscilloscope tube 17 over a full-wave rectifier 18 and a video amplifier 19. Amplifier 19 is shown to be controlled from one of the switch tubes indicated at 14. A suitable sweep generator 20 is also provided for the control of the P.P.I. 17, synchronously energized from the modulating pulse oscillator 3.

Figure 2:
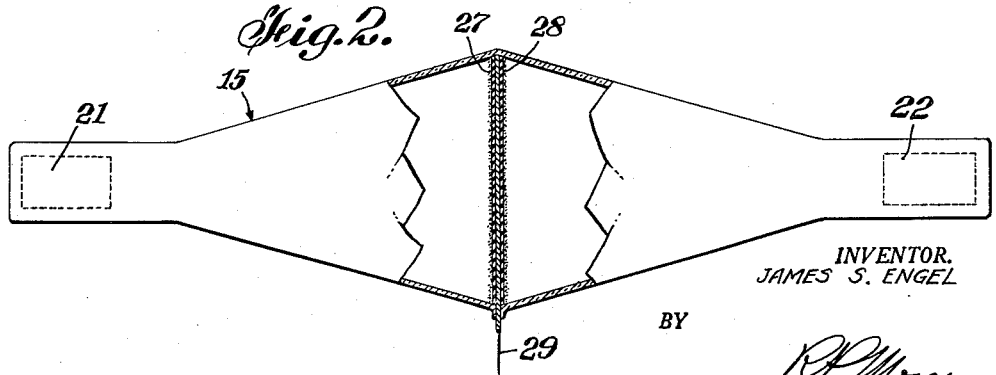
FIGURE 2 is a schematic representation of comparison or storage tube for use with the system of FIGURE 1.
Figure 3:
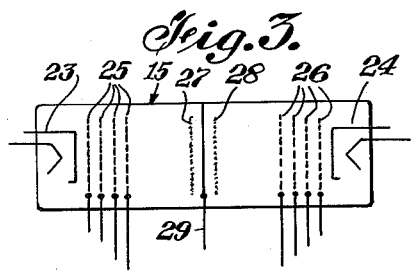
FIGURE 3 is a more detailed schematic representation of the tube shown in FIGURE 2.
Figure 4:
FIGURES 4, 5, 6 and 7 are illustrative of alternative embodiments of the comparison tube of FIGURE 2.
Figure 5:
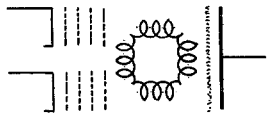
Figure 6:
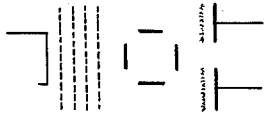
Figure 7:
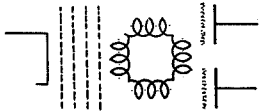

Referring now to the figures illustrating the storage or comparison tube, the tube indicated in FIGURES 2 and 3 contains two electron guns shown respectively at 21 and 22, each including a cathode 23, 24 and a plurality of control electrodes shown at 25 and 26 The tube also contains two mosaics disposed substantially back-to-back and incidated at 27 and 28. One signal electrode is provided for the tube which is disposed at 29 intermediate the two mosaics 27 and 28. In the alternative constructions shown in FIGURES 4 and 5, the comparison tube contains two electron guns, one means of deflection which may be either magnetic or electrostatic, a common mosaic and one signal electrode. Another alternative construction as illustrated in FIGURES 6 and 7 has electrostatic or magnetic deflection means shown used with a tube incorporating a signal electron gun but having a split mosaic and two signal electrodes.

In analyzing the operation of the system shown in FIG. 1, it is to be noted that the system is based on the principle that it is possible to store a video signal that has been received due to the reflection of a transmitted pulse signal. The time of the required storage is determined by the pulse repetition frequency. The storage itself for the indicated length of time is effected by charging the mosaic-storage tube by means of an electron beam. This charge may be held for the time of a single signal period of the tube which, for instance, may recur at the rate of 30 times a second.

By using the indicated switch tubes 14 to operate the video amplifiers 12 and 13, the system is made to operate so that the amplifier 12 is activated during one pulse period while the amplifier 13 is rendered inoperative. Then, in synchronism with the next pulse supplied by the crystal controlled modulating pulse oscillator 3 which governs the pulse repetition frequency, the switch tubes 14 reverse the respective activation of the two amplifiers 12 and 13 so that the amplifier 12 is rendered inoperative while the video amplifier 13 becomes activated. Similarly, as the two video amplifiers 12 and 13 are being switched, the sweep generator 16 for the storage tube is being switched in synchronism. As already indicated, the inverter included in the amplifier 13 is utilized to change the polarity of the signal in respect to that of the video amplifier 12.

Figure 8:
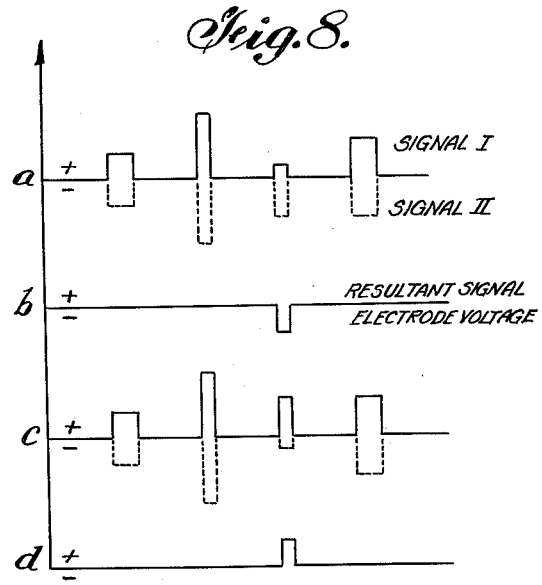
FIGURE 8 is a series of graphs illustrating certain operative conditions of the system of FIGURE 1.

Thus, as soon as a given pulse has been initiated, a signal will be placed on one side of the mosaic of the comparison tube. Upon the starting of the second or succeeding pulse, the signals are switched whereby a charge is placed on the other mosaic. If the signals are equal, the effective average signal voltage output appearing on the signal electrode will be zero, polarity of the signals being of opposite sign. In the event that the two signals are not equal a signal voltage will result on the signal electrode. This is illustrated with reference to FIGURE 8 where a graph a represents the sweep trace of the electron beam in the storage tube 15 as modulated by signals from the video amplifiers 12 and 13. The two signals are effective as deflecting forces with respect to the beam with opposite polarity as explained hereinabove. The positive signal I illustrates a normal video pulse signal comprising fixed targets and one moving target. The signal II is similar except that it has been inverted by the inverter in the video amplifier 13. The resultant voltage shown in graph b is then fed into video amplifier 19 and to plane position indicator 17 by way of a full-wave rectifier 18 since such results may be positive or negative as illustrated in graphs b and d.

By inspection of the system it will be evident that upon receipt of the third signal there will be no signal for comparison therewith. This would have the effect of clouding the screen of the plane position indicator. In order therefore, to avoid such an undesired indication, the output of the switch tube 14 controlling the video amplifier 12 is also used to cut off the video amplifier 19 feeding the indicator tube 17. Thus, no activation is obtained at the P.P.I. tube 17 during the occurrence of the third signal. This is of course, effective for every odd pulse, thereby allowing a resulting comparison to be made between two successive pulses and a compared output only being allowed to reach the position indicator tube 17.

Suitable circuit modifications, which will suggest themselves if the alternative construction shown in FIGURES 4 through 7 are used, are generally intended to be within the scope of the present invention.

It will be seen from the above that the system described will effectively eliminate fixed target indications normally appearing on a P.P.I. screen and will reveal moving targets only on the indicating tube. The system relies on the Doppler effect and the storage and comparison of electrical energy. By using a continuous oscillator as the source for the transmitted signals, phase variations resulting from the reflection due to a moving target may be indicated. Since most radio obstacle indicator systems do not operate continuously but are pulsed, the above is an effective method for preserving the phase of each pulse until the next pulse has been transmitted.

By the use of a very stable oscillator and by mixing the output of the oscillator with the radio frequency signal, it has been possible to obtain an intermediate frequency signal which will preserve the original phase of the radio frequency pulse. This intermediate frequency signal pulse is used to synchronously energize the intermediate frequency oscillator 7. The I.F. oscillator will then oscillate in synchronism with the original starting phase of the radio frequency pulse. It thus becomes possible to refer all signals of a given pulse period to this reference oscillator. By storing the information due one pulse and comparing it with the information due to the next pulse, a cancellation of the intelligence from fixed targets is obtained and information only due to moving targets will remain. By employing a dual type storage tube as described in order to effect a comparison of the information due to successive pulses a positive result is obtained without additional circuits.

While I have described above the principles of my invention in connection with specific apparatus, it is to be clearly understood that this description is made only by way of example and not as a limitation to the scope of my invention.

What I claim is:

1. A radiant energy obstacle detecting system for indicating moving targets, comprising means for transmitting pulses of radiant energy, means for receiving pulse energy due to re-radiation of the transmitted pulses from objects in the path of the transmitted energy, an electronic device including mosaic means for storing electronic charges, alternatively operative means for applying the received signals due to successive transmitted pulses to said storage device for storage on said mosaic means with opposite polarity, and means responsive to the stored signals for combining said stored successive pulses for indicating the difference of said two successively stored pulses, said transmitting means including a stabilized modulating pulse repetition frequency source, a source of radio frequency, said receiving means including an intermediate frequency oscillator and means for operatively synchronizing said oscillator with said radio frequency source.

2. A radiant energy obstacle detecting system for indicating moving targets, comprising means for transmitting pulses of radiant energy, means for receiving pulse energy due to re-radiation of the transmitted pulses from objects in the path of the transmitted energy, an electronic device including mosaic means for storing electronic charges, alternately operative means for applying the received signals due to successive transmitted pulses to said storage device for storage on said mosaic means with opposite polarity, and means responsive to the stored signals for combining said stored successive pulses for indicating the difference of said two successively stored pulses, said applying means comprising a pair of video amplifiers, and a signal inverter included within one of said video amplifiers, a stabilized modulating pulse repetition frequency source within said transmitting means, means for alternately activating said respective amplifiers and means to synchronize said activating means from said stabilized source.

3. A radiant energy obstacle detecting system for indicating moving targets, comprising means for transmitting pulses of radiant energy, means for receiving pulse energy due to re-radiation of the transmitted pulses from objects in the path of the transmitted energy, an electronic device including mosaic means for storing electronic charges, alternately operative means for applying the received signals due to successive transmitted pulses to said storage device for storage on said mosaic means with opposite polarity, and means responsive to the stored signals for combining said stored successive pulses for indicating the difference of said two successively stored pulses, said transmitting means including a stabilized modulating pulse repetition frequency source, means for controlling the application of energy to said indicating means and means to synchronize the deactivation of said control means in synchronism with every odd pulse from said stabilized source.

4. A radiant energy obstacle detecting system for indicating moving targets, comprising means for transmitting pulses of radiant energy including a stabilized modulating pulse repetition frequency source, a generator of radio frequency energy for modulation by said pulses, means for receiving pulse energy due to reflections of the transmitted pulses from objects in the path of the transmitted energy, an intermediate frequency oscillator operatively associated with said receiving means, means for synchronizing said oscillator with the phase of the radio frequency pulses, an electronic device including two mosaics back to back for storing electronic charges, means for translating energy for each of said mosaics from said intermediate frequency oscillator, signal polarity inverter means included in one of said translating means, switch means for alternately activating said respective translating means, means for synchronizing said switch means and said electronic device from said pulse frequency source, means for indicating the output of said electronic device, means forming an energy translating path from said device to said indicating means including a full wave rectifier and an amplifier, and means including said switch means for deactivating said last named amplifier for every odd pulse of said stabilized pulse source.

References Cited in the file of this patent
UNITED STATES PATENTS

| | | |
|---|---|---|
| 2,422,135 | Sanders | June 10, 1947 |
| 2,430,038 | Weitz | Nov. 4, 1947 |
| 2,437,173 | Rutherford | Mar. 2, 1948 |
| 2,440,301 | Sharpe | Apr. 27, 1948 |